(12) United States Patent
Schirris et al.

(10) Patent No.: US 7,639,288 B2
(45) Date of Patent: Dec. 29, 2009

(54) COLOR SEPARATION

(75) Inventors: Johan Schirris, Veldhoven (NL); Paul Biezen, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 370 days.

(21) Appl. No.: 11/313,158

(22) Filed: Dec. 20, 2005

(65) Prior Publication Data

US 2006/0164558 A1 Jul. 27, 2006

(30) Foreign Application Priority Data

Dec. 27, 2004 (EP) .................................. 04107004

(51) Int. Cl.
*H04N 9/68* (2006.01)
*H04N 9/77* (2006.01)

(52) U.S. Cl. ...................... 348/235; 348/663; 348/234; 348/236

(58) Field of Classification Search ................. 348/363, 348/252, 234–236, 663; 382/312
See application file for complete search history.

(56) References Cited

U.S. PATENT DOCUMENTS

| 4,464,675 | A | * | 8/1984 | Balaban et al. ............. 348/665 |
| 4,651,196 | A | * | 3/1987 | Harwood et al. ............ 348/667 |
| 5,508,741 | A | * | 4/1996 | Hieda ......................... 348/252 |
| 5,640,211 | A | * | 6/1997 | Kawano et al. ............. 348/663 |
| 6,285,413 | B1 | * | 9/2001 | Akbayir ...................... 348/678 |
| 2003/0071921 | A1 | * | 4/2003 | Tanigawa .................... 348/664 |

FOREIGN PATENT DOCUMENTS

WO 99/29101 10/1999

OTHER PUBLICATIONS

John A. Eldon, "Integrated Video Interface Technology". Raytheon Electronics, San Diego, California 92121, 1058-6393/97, 1997, IEEE. pp. 648-652, Aug. 13, 2009.

* cited by examiner

*Primary Examiner*—Tuan Ho
*Assistant Examiner*—Selam T Gebriel
(74) *Attorney, Agent, or Firm*—Michael J. Striker

(57) ABSTRACT

In a color separation circuit, a camera comprising such a color separation circuit and a color separation method, an adapted luminance signal is recovered from an image sensor signal using an adaptive wide band filter, wherein the adaptive wide band filter is controlled by the amount of a diagonal energy in the image sensor signal.

11 Claims, 3 Drawing Sheets

COLOR SEPARATION

CROSS-REFERENCE TO RELATED APPLICATION

The invention described and claimed herein below is also described in German Patent Application DE 04107004.6 filed on Dec. 27, 2004. This German Patent Application provides the basis for a claim of priority of invention under 35 U.S.C. 119(a)-(d).

BACKGROUND OF THE INVENTION

This invention relates to a color separation circuit, a camera comprising such a color separation circuit and a color separation method.

Color separation is already known from the International Publication WO 99/29101. This publication discloses a dynamic range modification circuit comprising means for selecting a brightness component from a sensor output signal and two color components.

SUMMARY OF THE INVENTION

It is therefore an object of the present invention to provide a color separation circuit, a camera comprising such a color separation circuit and a color separation method, which is a further improvement of the prior art.

In accordance with the present invention the color separation circuit, the camera comprising such a color separation circuit and the color separation method have the advantage that the luminance component is restored using a frequency equalizing filter without overshoots in the luminance signal and therefore introduction of unwanted black or white lines around transients is prevented. This has the advantage that the resolution of the image is high.

Optical low pass filters have the advantages that they eliminate color moiré fringes and therefore optical low pass filters contribute to high image quality. It is advantageous that the adaptive wide band filter is adapted to compensate the usage of an optical low pass filter, because such an integration leads to cheap cameras.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

In the following a color separation circuit, a camera comprising such a color separation circuit and a color separation method is described. An adapted luminance signal is recovered from an image sensor signal using an adaptive wide band filter, wherein the adaptive wide band filter is controlled by the amount of diagonal energy in the image sensor signal.

Figure 1:
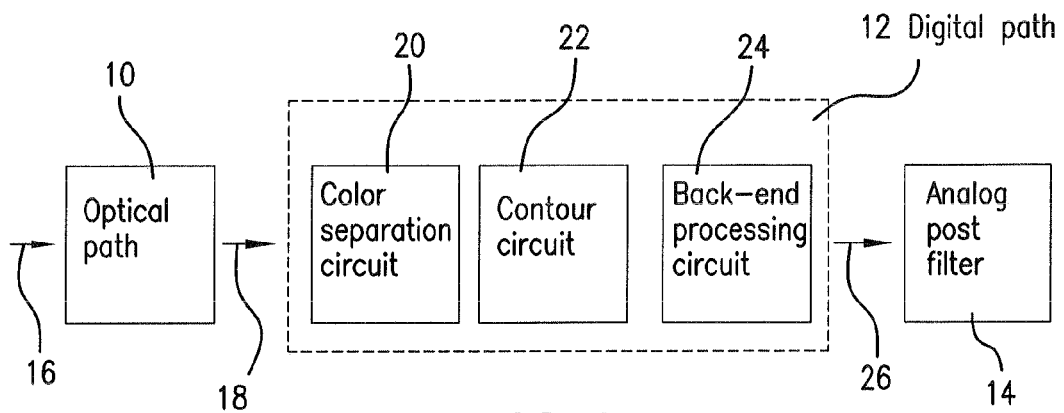
FIG. 1 is a view showing a block diagram of the camera of the present invention.

FIG. 1 shows a block diagram of the camera in accordance with the present invention comprising an optical path 10 and a digital path 12. In the optical path 10 a image sensor receives light 16 from a scene and furnishes an image sensor signal 18 to the digital path 12. The digital path 12 comprises a color separation circuit 20, a contour circuit 22 and a back-end processing circuit 24.

Figure 4:
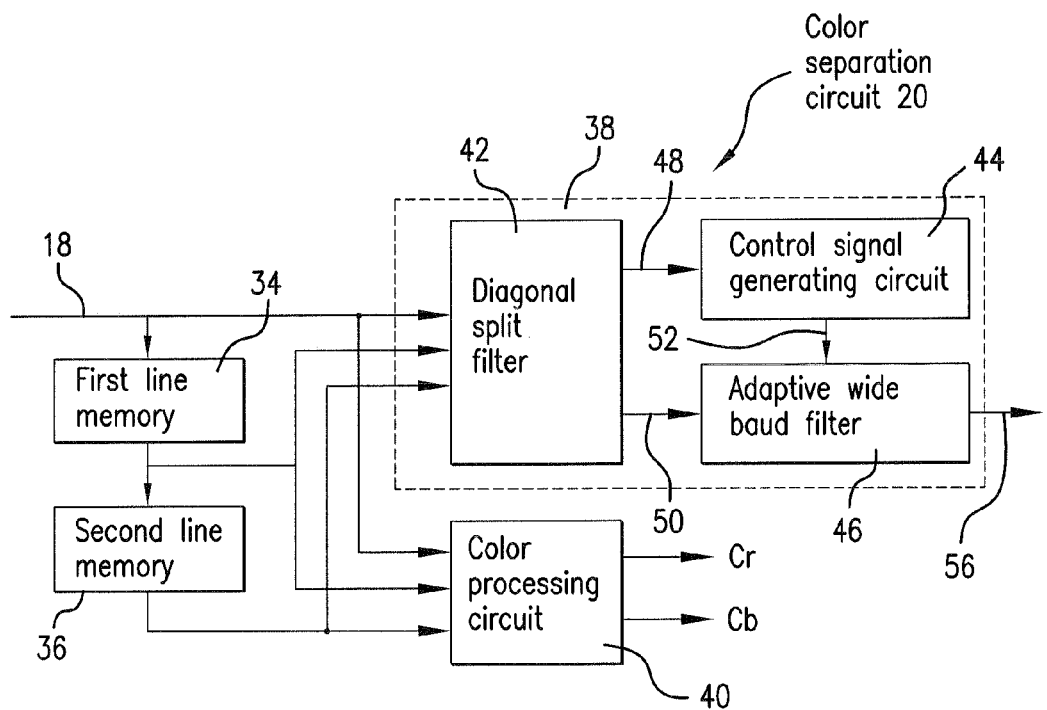
FIG. 4 is a view showing a block diagram of the color separation circuit of the present invention.

An embodiment of the color separation circuit 20 is shown in FIG. 4. The contour circuit 22 is a customer or set-maker adaptive filter. In the preferred embodiment the contour circuit 22 is a combination of 3 fir filters with the coefficients $[-a_1, 1+2a, -a]$, $[-b, 0, 1+2b, 0, -b]$ and $[-c, 0, 0, 1+2c, 0, 0, -c]$, wherein the adaptivity is achieved with settings a, b and c. The luminance signal is filtered by the 3 filters and the outputs are added. The output signal 26 of the digital path 12 is applied to an analog post filter 14. The analog post filter 14 removes the repeat spectra that remain after digital to analog conversion. In the preferred embodiment the analog post filter 14 is a third and/or fifth order filter with a zero at the sample frequency fs and an attenuation of more than 10 dB at fs/2.

Figure 2:
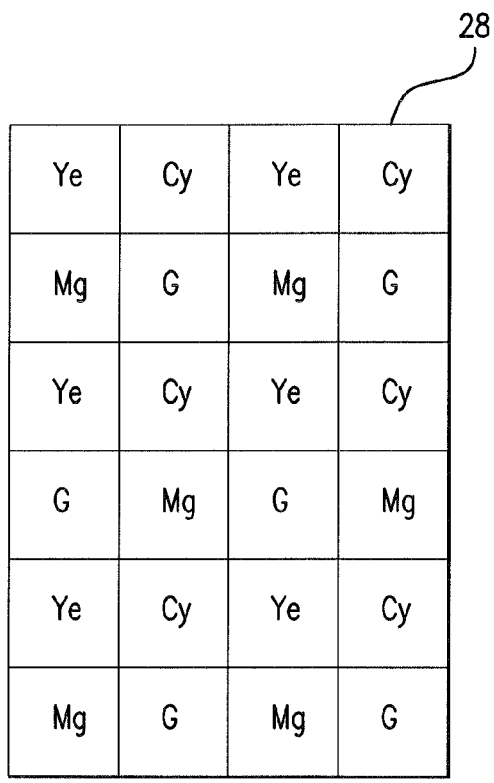
FIG. 2 is a view showing a color filter of the present invention.

FIG. 2 shows a color filter 28 for use on the surface of the image sensor. In the preferred embodiment the image sensor is a single CCD (charge couple device) color image sensor. While in a 3-CCD camera three brightness signals are available for red (R), green (G) and blue (B), respectively, the image sensor signal 18 from a 1-CCD color image sensor contains both brightness and color information. Ye indicates a yellow pixel of the image sensor, Cy indicates a cyan pixel, Mg indicates a magenta pixel and G indicates a green pixel. In another embodiment other complementary mosaic or RGB Bayer color filters are used.

Figure 3:
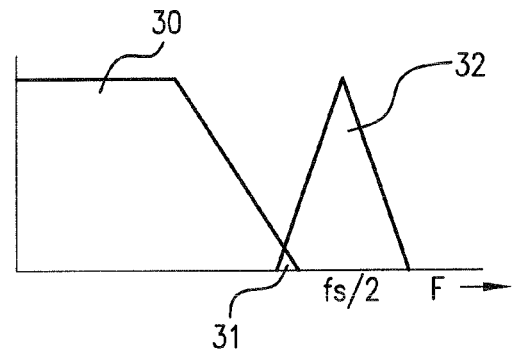
FIG. 3 is a view showing a frequency spectrum of the image sensor signal of the present invention.

FIG. 3 illustrates how the luminance signal 30 and the color signal 32 are distributed in the frequency domain of the image sensor signal 18. In the preferred embodiment the image sensor signal 18 has a frequency spectrum in which the luminance signal 30 is present at base band and around all harmonics m *fs of the sample frequency fs. The color signal 32 results from the described color filter 28 on the sensor surface, wherein alternate pixels being covered by alternate colors. With two alternating colors in the horizontal read-out direction, a repeating frequency spectrum with a frequency offset of half the sample frequency fs/2 is obtained at the image sensor signal 18. The color signal 32 is located around half the sample frequency fs/2. The spectrum of the luminance signal 30 and spectrum of the color signal 32 overlap 31, wherein the luminance signal 30 curve having a dip at fs/2. The overlap 31 is the main cause of the moiré and false colors.

FIG. 4 shows a block diagram of the color separation circuit 20, comprising a first line memory 34, a second line memory 36, a luminance separation circuit 38 and a color processing circuit 40. The luminance separation circuit 38 comprises a diagonal split filter 42, a control signal generating circuit 44 and an adaptive wide band filter 46. In the preferred embodiment the color separation circuit 20 and/or the luminance separation circuit 38 are an integrated circuit (IC). The color separation circuit 20 (color separation) delivers a luminance component and two color components Cr and Cb, wherein Cr is the red component or V and Cb the blue component or U as in YUV, wherein Y stands for the luminance component (the brightness) and U and V are the chrominance (color) components. In the preferred embodiment per line only one color component is available while the other component is interpolated by averaging the color component from the previous and next line. Therefore three 3 line inputs are needed. Both Cr and Cb are made by subtracting a sensor pixel from the previous pixel and then multiply the result alternatively with +1 and −1 pixel based, wherein the last function demodulates the color carrier at fs/2 to base band.

The image sensor signal 18 is applied to a first input of the diagonal split filter 42 of the luminance separation circuit 38, to a first input of the color processing circuit 40 and to an input of the first line memory 34. The first and the second line memory 34, 36 are adapted to store one image line of the image sensor. An output of the first line memory 34 is applied to an input of the second line memory 36, to a second input of the diagonal split filter 42 of the luminance separation circuit 38 and to a second input of the color processing circuit 40, wherein an output of the second line memory 36 is applied to a third input of the diagonal split filter 42 of the luminance separation circuit 38 and to a third input of the color processing circuit 40.

The color processing circuit 40 processes three input signals and furnishes two color output signals Cr and Cb. The diagonal split filter 42 is a two dimensional filter with two color output signals Cr and Cb. The diagonal split filter 42 is a two dimensional filter with two filters and two output signals: A diagonal high pass filter of the diagonal split filter 42 is used to provide the diagonal high signal 48 to be used in the subsequent control signal generating circuit 44, wherein a diagonal low pass filter of the diagonal split filter 42, which is scalable to an all pass filter, is used to provide the diagonal low signal 50 to be used as input for the adaptive wide band filter 46.

In the preferred embodiment the control signal generating circuit 44 measures the diagonal energy 54 by calculating the absolute value of the diagonal high pass filter, wherein the absolute value being an approximation of a square function. Additionally, the result is widened with a wide FIR filter to include transients. The control signal generating circuit 44 generates a control signal 52 from the diagonal high signal 48 in dependence upon the diagonal energy 54 and furnishes the control signal 52 to the adaptive wide band filter 48. The adaptive wide band filter 48 processes the diagonal low signal 50 and the control signal 52 and furnishes an adaptive luminance signal 56. The functioning of the control signal generating circuit 44 and the adaptive wide band filter 46 is explained with reference to FIGS. 5 and 6.

Figure 6:
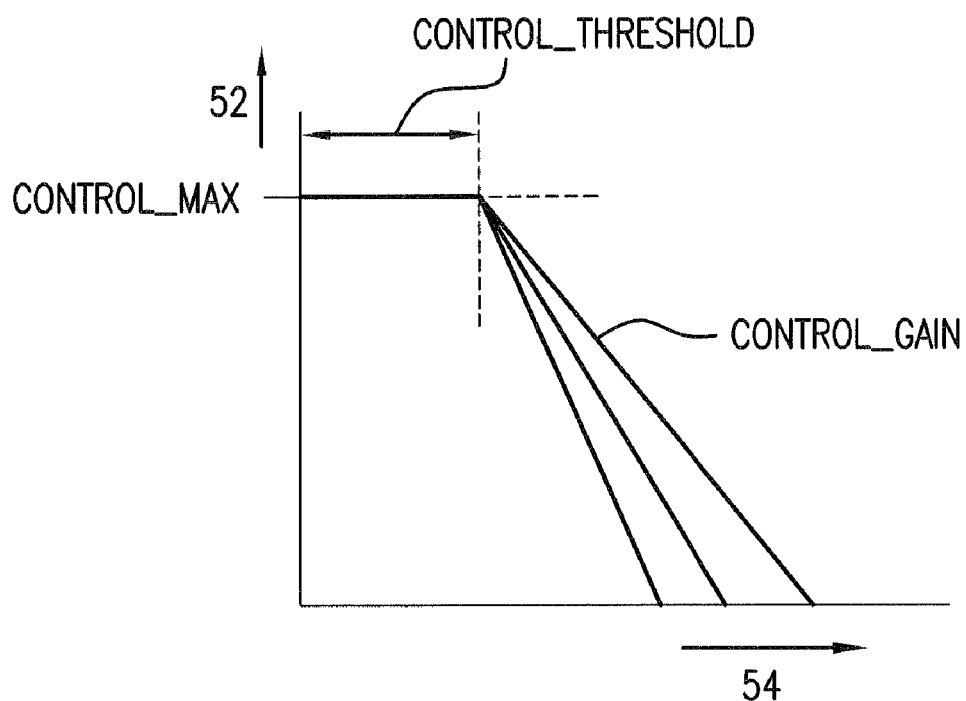
FIG. 6 is a view showing a diagram of the present invention.

FIG. 6 shows a diagram of the functional dependence of the control signal 52 of the diagonal energy 54. The functional dependence is set by three parameters CONTROL_MAX, CONTROL_THRESHOLD and CONTROL_GAIN. CONTROL_MAX defines the amount of compensation needed for a optical low pass filter in the optical path 10. An optical low pass filter is used for example to eliminate color moiré fringes. In the preferred embodiment CONTROL_MAX passes from 64 to 128, wherein the parameter CONTROL_MAX is set to 128 with a standard cosine optical low pass filter and to 64 if no optical low pass filter is used. The parameter CONTROL_TRESHOLD defines the starting point where the curve will start to decrease and the parameter CONTROL_GAIN defines the slope of the curve until the zero level is reached. Therefore the control signal generating circuit 44 has an output (control signal 52) proportional to the amount of the diagonal energy 54 in the image sensor signal 18.

Figure 5:
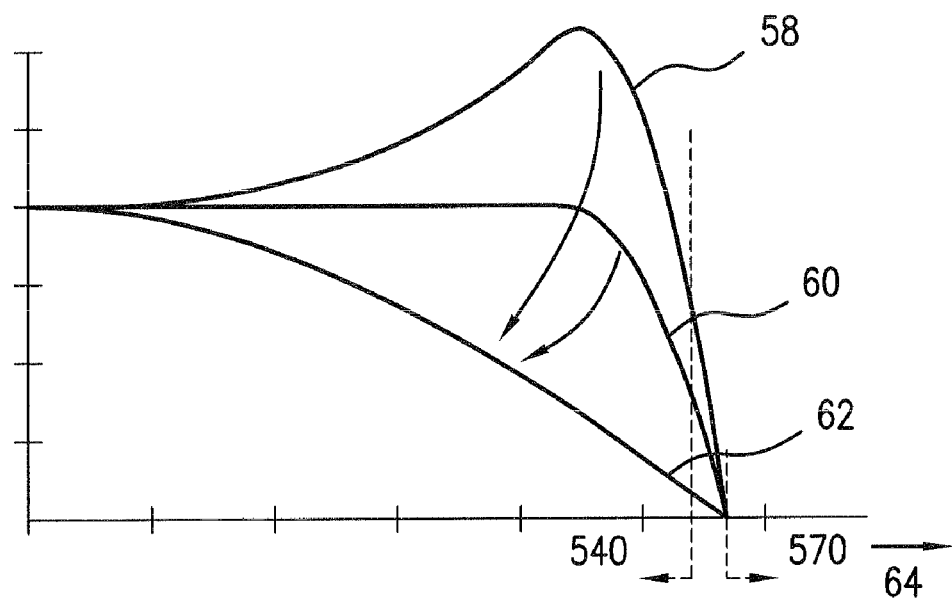
FIG. 5 is a view showing the transfer function of the adaptive wide band filter of the present invention.

FIG. 5 shows the transfer functions 58, 60, 62 of the adaptive wide band filter 46 in dependence on the frequency 64 expressed by lines. The adaptive wide band filter 46 has a zero point at half the sample frequency fs/2 at 570 lines to eliminate color modulation. Its bandwidth is made as flat as possible for the spectrum up to 570 lines, wherein flat meaning almost 0 dB for the complete spectrum. In the preferred embodiment the attenuation of the transfer functions 58, 60, 62 at 540 lines is 8 dB, but at least above the visibility limit of −20 dB. The adaptive wide band filter 46 is controlled by the control signal 52 gradually changes the transfer functions 58, 60 from wide to narrow transfer function 62.

FIG. 5 shows three transfer functions 58, 60, 62. The first transfer function 58 is applied if the control signal 52 is set to CONTROL_MAX=128 in order to compensate a standard cosine optical low pass filter. The second transfer function 60 is applied if the control signal 52 is set to CONTROL_MAX=64, because no optical low pass filter is used. The third transfer function 62 is applied if the control signal 52 is set to zero, because the diagonal energy 54 is high. In summary, the filter transfer including the optical low pass filter compensation is designed to be maximally flat. The luminance separator circuit 38 has a resolution exceeding 540 lines for scenes with low color modulation in the image sensor signal 18 and has a standard resolution at areas having high color modulation but without the artefacts that occur when applying a standard wide band filter on color transients and saturated color areas.

It will be understood that each of the elements described above, or two or more together, may also find a useful application in other types of constructions differing from the types described above.

While the invention has been illustrated and described as embodied in a color separation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A color separation circuit, comprising means for separating at least one color from an image sensor signal; means for generating a control signal from the at least one color signal; and means for furnishing an adapted luminance signal from the image sensor signal in dependence upon the control signal, wherein said means for furnishing an adapted luminance signal is an adaptive wide band filter with its transfer function in dependence upon said control signal.

2. A color separation circuit as defined in claim 1, wherein said means for separating at least one color signal from an image sensor signal is a diagonal split filter.

3. A color separation circuit as defined in claim 2, wherein said diagonal split filter includes a filter selected from the group consisting of a high pass filter, a low pass filter, and both.

4. A color separation circuit as defined in claim 1, wherein said means for separating at least one color signal from an image sensor signal separate from the image sensor signal a signal selected from the group consisting of a luminance signal, two color signals, and both.

5. A color separation circuit as defined in claim 1, wherein said means for furnishing an adapted luminance signal furnish an adapted luminance signal from the luminance signal in dependence upon the control signal.

6. A color separation circuit as defined in claim 1, wherein said means for generating a control signal measure a diagonal energy.

7. A color separation circuit as defined in claim 1, wherein said adaptive wide band filter sets a shape of the transfer function in dependence upon said control signal.

8. A color separation circuit as defined in claim 1, wherein said means for furnishing an adaptive luminance signal compensate an optical low pass filter.

9. A camera, comprising an image sensor for generating an image sensor signal; and a color separation circuit for obtaining an adaptive luminance signal from an image sensor signal and including means for separating at least one color signal from an image sensor signal; and means for furnishing an adapted luminance signal from the image sensor signal in dependence upon the control signal, wherein said means for furnishing an adapted luminance signal is an adaptive wide band filter with its transfer function set in dependence upon said control signal.

10. A camera as defined in claim 9, wherein said image sensor is a single CCD color image sensor.

11. A color separation method, comprising the steps of separating at least one color signal from an image sensor signal;
generating a control signal from the color signal; and furnishing an adapted luminance signal from the image sensor signal in dependence upon the control signal, wherein said furnishing an adapted luminance signal include furnishing by an adapted wide band filter with its transfer function set in dependence upon the control signal.

\* \* \* \* \*